US012762832B2

(12) United States Patent
Pandey et al.

(10) Patent No.: US 12,762,832 B2
(45) Date of Patent: Oct. 13, 2026

(54) FRAME BY FRAME TIME AND SPACE-BASED OBJECT MAPPING IN MULTIMEDIA

(71) Applicant: International Business Machines Corporation, Armonk, NY (US)

(72) Inventors: Diwesh Pandey, Bangalore (IN); Tathagato Bose, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 149 days.

(21) Appl. No.: 18/402,228

(22) Filed: Jan. 2, 2024

(65) Prior Publication Data

US 2025/0218077 A1 Jul. 3, 2025

(51) Int. Cl.

*G06V 10/74* (2022.01)
*G06T 7/70* (2017.01)
*G06T 11/65* (2026.01)
*G06V 20/70* (2022.01)

(52) U.S. Cl.

CPC .............. *G06V 10/761* (2022.01); *G06T 7/70* (2017.01); *G06T 11/65* (2026.01); *G06V 20/70* (2022.01); *G06V 2201/07* (2022.01)

(58) Field of Classification Search

CPC ......... G06T 11/60; G06T 7/70; G06V 10/761; G06V 20/70; G06V 2201/07; G06V 20/41

See application file for complete search history.

(56) References Cited

U.S. PATENT DOCUMENTS

| | | | | |
|---|---|---|---|---|
| 8,041,075 | B2 | 10/2011 | Lei et al. | |
| 11,513,658 | B1 * | 11/2022 | Olsen | H04L 65/612 |
| 2005/0041679 | A1 * | 2/2005 | Weinstein | H04N 7/17336 725/100 |
| 2007/0132767 | A1 | 6/2007 | Wright et al. | |
| 2013/0141530 | A1 * | 6/2013 | Zavesky | G06T 19/20 348/43 |
| 2017/0374403 | A1 * | 12/2017 | Gupta | H04N 21/2668 |
| 2018/0374233 | A1 * | 12/2018 | Zhou | G06F 18/22 |
| 2020/0118594 | A1 * | 4/2020 | Oxholm | G06T 7/11 |
| 2020/0120369 | A1 * | 4/2020 | Oz | H04N 21/8146 |
| 2021/0120286 | A1 * | 4/2021 | Govil | H04N 21/234318 |
| 2021/0329338 | A1 * | 10/2021 | Khov | G06F 16/4393 |
| 2021/0383579 | A1 * | 12/2021 | Lam | G06F 18/21 |
| 2022/0138913 | A1 * | 5/2022 | Huang | G06V 10/62 348/241 |
| 2022/0207851 | A1 * | 6/2022 | Saputra | G11B 27/031 |
| 2022/0292649 | A1 * | 9/2022 | Wang | G06T 5/60 |
| 2022/0301118 | A1 * | 9/2022 | Frey | G06T 5/77 |

(Continued)

OTHER PUBLICATIONS

Chang et al., "VORNet: Spatio-temporally Consistent Video Inpainting for Object Removal," 2019 IEEE/CVF Conference on Computer Vision and Pattern Recognition Workshops (CVPRW), Jun. 16-17, 2019, pp. 1-10, IEEE, accessed Dec. 4, 2023, https://ieeexplore.ieee.org/document/9025383.

(Continued)

*Primary Examiner* — Jin Cheng Wang

(74) *Attorney, Agent, or Firm* — Yee & Associates, P.C.

(57) ABSTRACT

A computer implemented method processes a video. A processor set identifies frames in the video. The processor set recognizes objects in a frame in the frames. The processor set modifies each of the objects in the frame that do not fit the geospatial model for the frames to form a revised frame for the video.

20 Claims, 12 Drawing Sheets

(56) References Cited

U.S. PATENT DOCUMENTS

| | | | | |
|---|---|---|---|---|
| 2024/0020811 | A1* | 1/2024 | Jin | H04N 21/23418 |
| 2024/0303851 | A1* | 9/2024 | Jiang | G06V 20/41 |
| 2024/0333873 | A1* | 10/2024 | Gehrmann | G06T 5/20 |

OTHER PUBLICATIONS

Le et al., "Object removal from complex videos using a few annotations," Computational Visual Media, Sep. 3, 2019, pp. 267-291, vol. 5, No. 3, Tsinghua University Press, Springer Link, accessed Dec. 4, 2023, https://link.springer.com/article/10.1007/s41095-019-0145-0.

Sevillano et al., "Geo-Tagging Online Videos Using Semantic Expansion And Visual Analysis," 2012 13th International Workshop on Image Analysis for Multimedia Interactive Services, May 23-25, 2012, 5 pages, accessed Dec. 4, 2023, https://ieeexplore.ieee.org/document/6226764.

Shetty et al., "Adversarial Scene Editing: Automatic Object Removal from Weak Supervision," airXiv: 1806.01911, Jun. 5, 2018, pp. 1-13, Cornell University, accessed Dec. 15, 2023, https://arxiv.org/abs/1806.01911.

* cited by examiner

FRAME BY FRAME TIME AND SPACE-BASED OBJECT MAPPING IN MULTIMEDIA

BACKGROUND

The disclosure relates generally to synthesizing videos and more specifically to synthesizing a video on a frame-by-frame basis using a timeline and geography.

Recording a video for a movie or a commercial can have various constraints based on the requirements in the script. For example, a movie for drama can be based on a period of time that is a few centuries back from the current time. Further, this movie may also have another constraint related to a specific geography. With respect to the movie, to meet the constraint, a movie set is created to reflect the time period and geography.

In a similar fashion, a commercial for a new car announcement can have various constraints. For example, the commercial can show different versions of the car over the years up to the new version of the car that is being announced. In this case, the constraint is the different versions of the car over the years. The commercial can be filmed with the different versions of the car at the same location. Video editing and computer-generated imagery (CGI) can be used to show a seamless transition between the cars driving on the same road.

SUMMARY

According to one illustrative embodiment, a computer implemented method processes a video. A processor set identifies frames in the video. The processor set recognizes objects in a frame in the frames. The processor set modifies each of the objects in the frame that do not fit the geospatial model for the frames to form a revised frame for the video. According to other illustrative embodiments, a computer system and a computer program product process a video.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
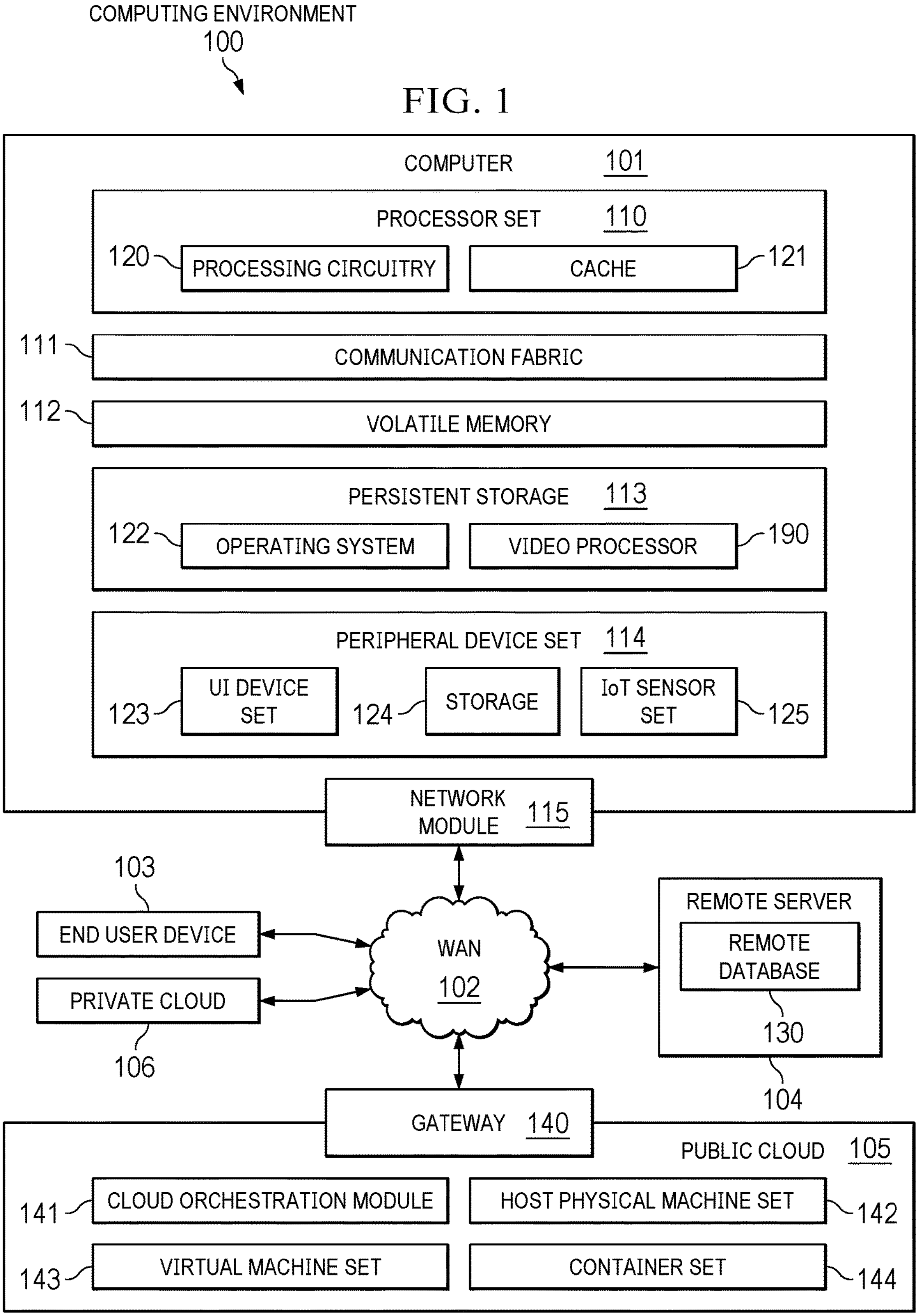
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as video processor 190. In addition to video processor 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and video processor 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in video processor 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in video processor 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. Creating a movie set, props, clothes, and other objects for a particular time period can be complex. This complexity can be further compounded when the video is also situated in a particular geographic location. For example, the movie may be filmed in France while the storyline for the video is located in Australia.

As a result, a huge production cost is present to replicate the desired time period and geographic location. The creation of these items can take time and effort as well as having a large cost. This time can result in undesired delays for filming the movie.

Further, even with all of the time and effort taken to create the movie set, props, and clothes, things can be missed. For example, a piece of clothing, a coffee cup, a sign, or object that is not related to the time or the geography can be recorded during filming of the movie and become seen in the movie. Although some editing can be performed after filming the movie, little time and room are present to make corrections with aggressive timelines to release the movie.

Thus, illustrative embodiments of the present invention provide a computer implemented method, computer system, and computer program product for processing a video. In one illustrative example, a computer implemented method processes a video. A processor set identifies frames in the video. The processor set recognizes objects in a frame in the frames. The processor set modifies each of the objects in the frame that do not fit the geospatial model for the frames to form a revised frame for the video.

Figure 2:
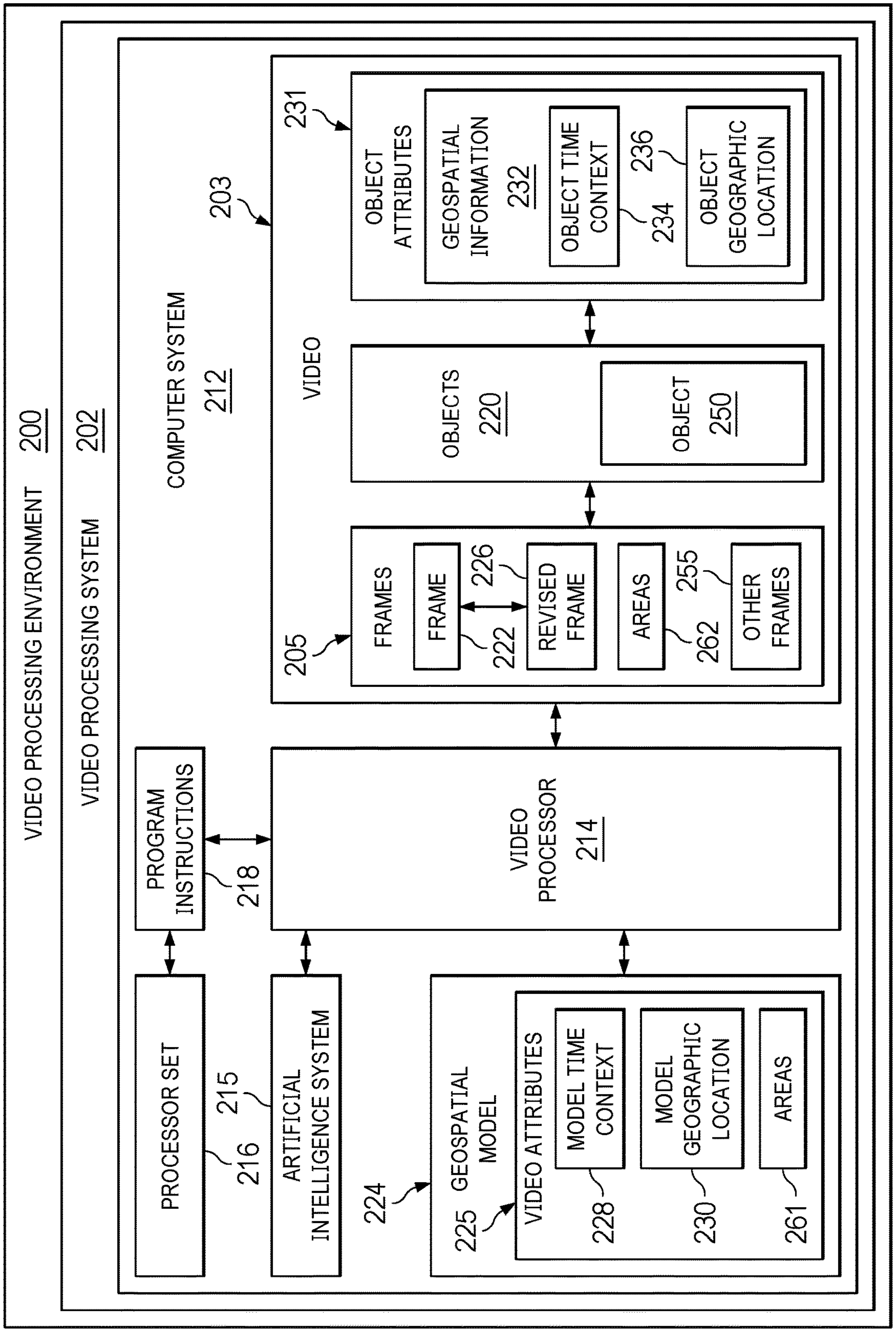
FIG. 2 is a block diagram of a video processing environment in accordance with an illustrative embodiment.

With reference now to FIG. 2, a block diagram of a video processing environment is depicted in accordance with an illustrative embodiment. In this illustrative example, video processing environment 200 includes components that can be implemented in hardware such as the hardware shown in computing environment 100 in FIG. 1. Video processing system 202 can be used to process video 203. In this example, video 203 comprises frames 205. Video 203 can be, for example, a movie, a commercial, a news report, an animation, music video, a webinar, or other type of video.

In this illustrative example, video processor 214 in video processing system 202 can process video 203 to ensure that the video 203 has a desired spatial and temporal content. In other words, video processor 214 can process frames 205 to have the desired time and location which may be different from the actual time and location for the filming or recording of video 203. Video processor 214 may be implemented using video processor 190 in FIG. 1.

Video processor 214 can be implemented in software, hardware, firmware or a combination thereof. When software is used, the operations performed by video processor 214 can be implemented in program instructions configured to run on hardware, such as a processor unit. When firmware is used, the operations performed by video processor 214 can be implemented in program instructions and data and stored in persistent memory to run on a processor unit. When hardware is employed, the hardware can include circuits that operate to perform the operations in video processor 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes processor set 216 that is capable of executing program instructions 218 implementing processes in the illustrative examples. In other words, program instructions 218 are computer-readable program instructions. Processor set 216 can be an example of processor set 110 in FIG. 1.

As used herein, a processor unit in processor set 216 is a hardware device and is comprised of hardware circuits such as those on an integrated circuit that respond to and process instructions and program code that operate a computer. Processor set 216 can be a number of processor units and can be implemented using processor set 110 in FIG. 1. The processor units can also be referred to as computer processors. When processor set 216 executes program instructions 218 for a process, processor set 216 can be one or more processor units that are in the same computer or in different computers. In other words, the process can be distributed between processor units in processor set 216 on the same or different computers in computer system 212.

Further, processor set 216 can include the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

Although not shown, processor set 216 can also include other components in addition to the processor units or processing circuitry. For example, processor set 216 can also include a cache or other components used with processor units or other processing circuitry.

In this illustrative example, video processor 214 identifies frames 205 in video 203. Video processor 214 also recognizes objects 220 in frame 222 in frames 205. In processing video 203, video processor 214 modifies each of objects 220 in frame 222 that do not fit geospatial model 224 for frames 205 to form revised frame 226 for video 203.

Video processor 214 recognizes objects in frame 222 in frames 205 using a number of different techniques. For example, the recognition of objects 220 can be performed by video processor 214 using artificial intelligence system 215. In this example, artificial intelligence system 215 is a system that has intelligent behavior and can be based on the function of a human brain. Artificial intelligence system 215 comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system. In this example, artificial intelligence system 215 can be selected from at least one of a convolutional neural network trained to classify objects, a support vector machine, an expert system, a computer vision system, or other systems that can operate to classify objects 220.

With a computer vision system in artificial intelligence system 215, a feature matching technique can be used to map visual features of objects with the database objects. This mapping can be used to identify the objects and features of the objects. Further, in performing object analysis, image segmentation can be used to isolate objects from image and analyze the features of the objects. A textual analysis can also be used in these examples. The textual context of objects, such as signs or labels on objects can be analyzed. For example, natural language processing can be used in artificial intelligence system 215 to analyze text on objects to determine the context such as time period or location.

In this illustrative example, objects 220 can take a number of different forms. For example, objects 220 can be selected from at least one of a vehicle, a car, an airplane, a building, a dam, a road, a mountain, a valley, a river, a tree, a flower, a farm, a factory, a fish, a person, a car part, a piece of clothing, a window frame in a house, or other types of objects.

Further, these techniques can also be used to determine object attributes 231 for objects such as object time context 234 and object geographic location 236 for objects 220 identified in frame 222. Object time context 234 and object geographic location 236 are object attributes 231 that can be referred to as geospatial information 232 for objects 220.

In one example, object time context 234 for a car can be the year that the car was introduced or the model year of the car. As another example, object time context 234 for a mobile phone is the year that the mobile phone was introduced. As another example, object geographic location 236 for a window can be a location where a particular type of window is found. In another example, object geographic location 236 for a plant can be a location where a plant is found. For example, a tree may be found only on one continent, in a particular region, or in several countries.

In this illustrative example, video processor 214 generates geospatial model 224 for video 203. Geospatial model 224 defines video attributes 225 such as model time context 228 and model geographic location 230 for frames 205 in video 203 based on the time and location for video 203. In this example, model time context 228 and model geographic location 230 are defined for each frame in frames 205. As a result, different groupings of frames may have different time contexts and geographic locations.

The time and location for video 203 in geospatial model 224 may not be the actual time and location from the recording video 203. The time and location can be input video processor 214 and can be based on a script or storyboard for video 203. For example, video 203 may have been recorded in 2023 in Australia while the time and geographic location for video 203 based on the script for the video 203 is Canada. This time and geographic location are used to create geospatial model 224. In some cases, model time context 228 or model geographic location 230 in geospatial model 224 can be the same as when video 203 was recorded.

Further, model time context 228 and model geographic location 230 in geospatial model 224 can be different for different frames in frames 205. For example, a first portion of frames 205 has model time context 228 as 1970 while a second portion of frames 205 has model time context 228 as 1980. In this example, these two portions of frames 205 are identified in geospatial model 224 along with their corresponding time context. In a similar fashion, the first portion of frames 205 can be located in a mountain while the second portion of frames 205 can be located in a valley. These two different geographic locations for the two portions of frames 205 can also be identified in geospatial model 224.

In other examples, other numbers of times and geographic locations may be present. Further, in one illustrative example, model geographic location 230 may be fixed while model time context 228 changes. In yet another example, model time context 228 can change while model geographic location 230 is fixed.

In this illustrative example, the processing of frames 205 in video 203 can be sequentially frame by frame. In other illustrative examples, frame 222 can be processed in parallel or in other orders other than sequentially.

In this example, frame 222 in frames 205 is selected for processing. In this illustrative example, video processor 214 tags objects 220 in frame 222 with geospatial information 232. In other words, video processor 214 associates object time context 234 and object geographic location 236 determined for each of objects 220 with those objects. With this information, objects 220 can be processed to determine whether objects 220 fit geospatial model 224. Video processor 214 determines whether objects 220 in frame 222 fit geospatial model 224 using geospatial information 232 tagged to objects 220. This determination is made to indicate whether an object in a frame is out of place for video 203 based on model time context 228 and model geographic location 230 for video 203.

In one illustrative example, video processor 214 identifies model time context 228 and model geographic location 230 for frame 222 using geospatial model 224. Video processor 214 identifies object time context 234 and object geographic location 236 for objects 220 in frame 222. Video processor 214 then compares object time context 234 for objects 220 to model time context 228 for frame 222 and object geographic location 236 for objects 220 to model geographic location 230 for frame 222.

In this example, the determination is made using geospatial information 232 that includes both object time context 234 and object geographic location 236. In some illustrative examples, geospatial information 232 may be omitted or not present for one of object time context 234 or object geographic location 236. In this case, geospatial information 232 that is available is used to make the comparison with geospatial model 224.

For example, video processor 214 identifies model time context 228 for frame 222 using geospatial model 224. Different frames in frames 205 can have different time contexts. Video processor 214 identifies object time context 234 for objects 220 in frame 222. This identification of object time context 234 can be using machine learning models in artificial intelligence system 215 that are trained to identify object attributes 231, such as object time context 234 indicating when a particular object was available or present. Video processor 214 compares object time context 234 identified for objects 220 to model time context 228 for frame 222. The result of this comparison indicates whether particular objects in frame 222 fit geospatial model 224.

As another example, video processor 214 identifies model geographic location 230 for frame 222 using geospatial model 224. Video processor 214 identifies object geographic location 236 for objects 220 in frame 222. Video processor 214 then compares object geographic location 236 to model geographic location 230 for frame 222. This comparison is used to determine whether objects fit geospatial model 224. In these examples, both object time context 234 and object geographic location 236 for an object in objects 220 are compared to model time context 228 and model geographic location 230 for frame 222 to determine whether data object is geospatial model 224.

Video processor 214 can modify objects 220 that do not fit in geospatial model 224 in a number of different ways. In one example, object 250 in objects 220 in frame 222 does not fit geospatial model 224 for frame 222. Video processor 214 can remove object 250 from frame 222 in response to object 250 not fitting geospatial model 224.

In another example, video processor 214 can augment object 250 in objects 220 in frame 222 such that objects 250 fits geospatial model 224 in response to the object not fitting the geospatial model. In this example, augmenting object 250 can be performed in a number of different ways.

For example, if object 250 is a 2020 model car model and model time context 228 for frame 225 is 1995, then the 2020 model car can be replaced in frame 222 with a model 1995 car or an earlier model car. In another example, if the car is sold only in Europe and model geographic location 230 for frame 222 is Australia, the car can be replaced with a car model that is available in Australia. Similar changes can be made for objects such as window frames in a building, building architecture, clothing, and other objects.

Further, model time context 228 and model geographic location 230 for frame 222 in geospatial model 224 do not have to be the same everywhere within frame 222. For example, model time context 228 and model geographic location 230 can vary in different areas of frame 222. The variance in these video attributes can be defined in geospatial model 224 for the different areas.

For example, geospatial model 224 can also define areas 261 and can define model time context 228 and model geographic location 230 for each of areas 261 in frames 205. Video processor 214 can define areas 261 in geospatial model 224 for each frame in frames 205 in which each of areas 261 can have different video attributes.

In this example, the object recognition performed by video processor 214 can include determining areas 262 of frame 222 in which objects 220 are located. Object attributes 231 for objects 220 and areas 262 in which objects 220 are located can be compared to video attributes 225 for frame 222 to determine whether objects 220 fit geospatial model 224.

In response to processing frame 222, video processor 214 processes other frames 255 in frames 205. In these examples, video processor 214 recognizes objects 220 in other frames 255 in frames 205. Video processor 214 modifies each of objects 220 in other frames 255 that do not fit geospatial model 224. As a result, video 203 can be processed such that objects 220 in video 203 meet video attributes 225 of model time context 228 and model geographic location 230 in geospatial model 224 for video 203.

In one illustrative example, one or more solutions are present that overcome a problem with ensuring objects in videos meet desired attributes of the video such as time and location. As a result, one or more solutions can provide an ability to process videos to ensure consistency of objects in the videos with model time context and model geographic location.

Computer system 212 can be configured to perform at least one of the steps, operations, or actions described in the different illustrative examples using software, hardware, firmware or a combination thereof. As a result, computer system 212 operates as a special purpose computer system in which video processor 214 in computer system 212 enables processing videos to ensure consistency with attributes desired for the videos. In particular, video processor 214 transforms computer system 212 into a special purpose computer system as compared to currently available general computer systems that do not have video processor 214.

In the illustrative example, the use of video processor 214 in computer system 212 integrates processes into a practical application for processing and video to identify objects in the frames in a video, determine whether those frames meet video attributes for the frames, and modify objects as needed to ensure consistency with the desired video attributes for the video. In this manner, video processor 214 in computer system 212 provides a practical application of processing a video to increase consistency of objects in the video with the desired video attributes.

The illustration of video processing environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, geospatial model 224 can include other information in addition to video attributes 225 for video 203. This model can also include video attributes for the frames as recorded in addition to video attributes 225 for desired attributes for those frames. This information may be included as input in performing object recognition and determining what modifications are made to objects 220 that do not fit geospatial model 224.

Figure 3:
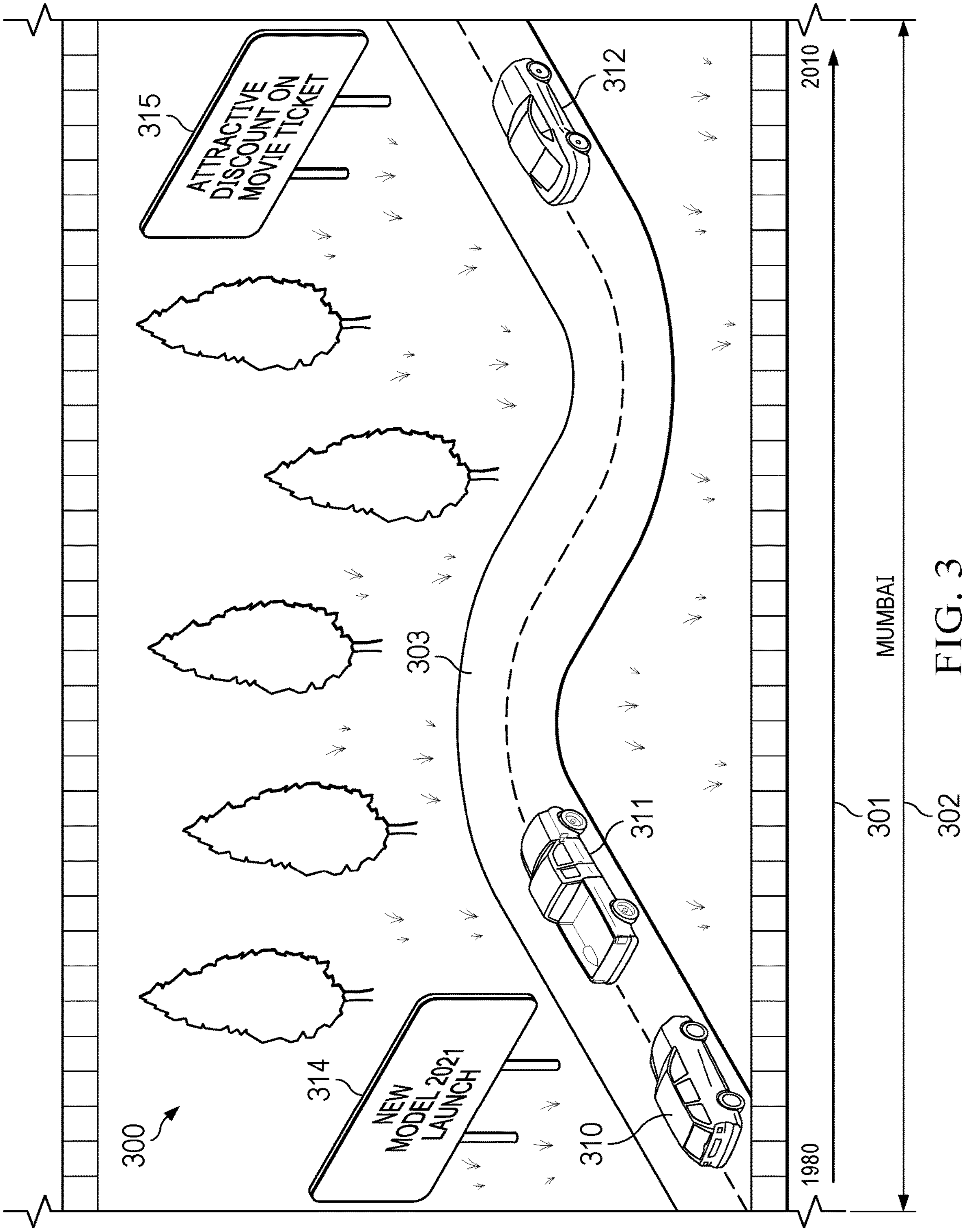
FIG. 3 is an illustration of a timeline for video in accordance with an illustrative embodiment.

Turning next to FIG. 3, an illustration of a timeline for video is depicted in accordance with an illustrative embodiment. In this illustrative example, frame 300 is a frame from a video that was recorded in 2022. Frame 300 is an example of an implementation for frame 222 in FIG. 2. In this example, the video has model time context 301 that is from 1980 to 2010 which is different from the time when the video was recorded. In this example, model time context 301 is a timeline. In this example, model geographic location 302 is Mumbai, which is the same location where the video was recorded.

Further, in this example, the objects within frame 300 should fit within model time context 301 and model geographic location 302. This timeline and geographic location are used to create the geospatial model for the video in which the model time context is from 1980 to 2010 and the model geographic location is Mumbai. In this example, model time context 301 and model geographic location 302 are the model time context and model geographic location for frame 300.

In this figure, vehicle 310, vehicle 311, and vehicle 312 are shown on road 303 in frame 300. Billboard 314 and billboard 315 are on the side of road 303. Billboard 314 advertises “new model 2021 launch” and billboard 315 advertises “attractive discount on movie ticket.”

In this example, the different objects for the vehicles and billboards are extracted from frame 300. Vehicle 310 is identified as being a model 2015 vehicle. Vehicle 311 is identified as being a model 2018 vehicle, and vehicle 312 is a model 2010 vehicle. The determination of the time for the vehicles can be formed by extracting the features of the vehicles and using features to determine the model year for the vehicles. Billboard 314 is for a time in 2021. Billboard 315 is for a time in 2009 in this example. The determination of the time for billboard 314 and billboard 315 can be determined in a number of different ways. For example, text and pictorial information can be extracted from these billboards and analyzed to determine the object time context for these billboards. In this example, all of these objects are located in Mumbai in this example.

These object time contexts and object geographic locations are compared with the geospatial model. All of the objects fit the geographic location in the geospatial model.

However, not all of the objects have object time contexts that fit the model time context. Billboard 314 does not fit the geospatial model because billboard 314 is for a time that is outside of model time context 301. Billboard 315 does fit model time context 301. Vehicle 310 and vehicle 311 are both outside of model time context 301 for the model time context. As a result, these two vehicles do not fit the geospatial model. Vehicle 312 falls within the model time context for the geospatial model.

Figure 4:
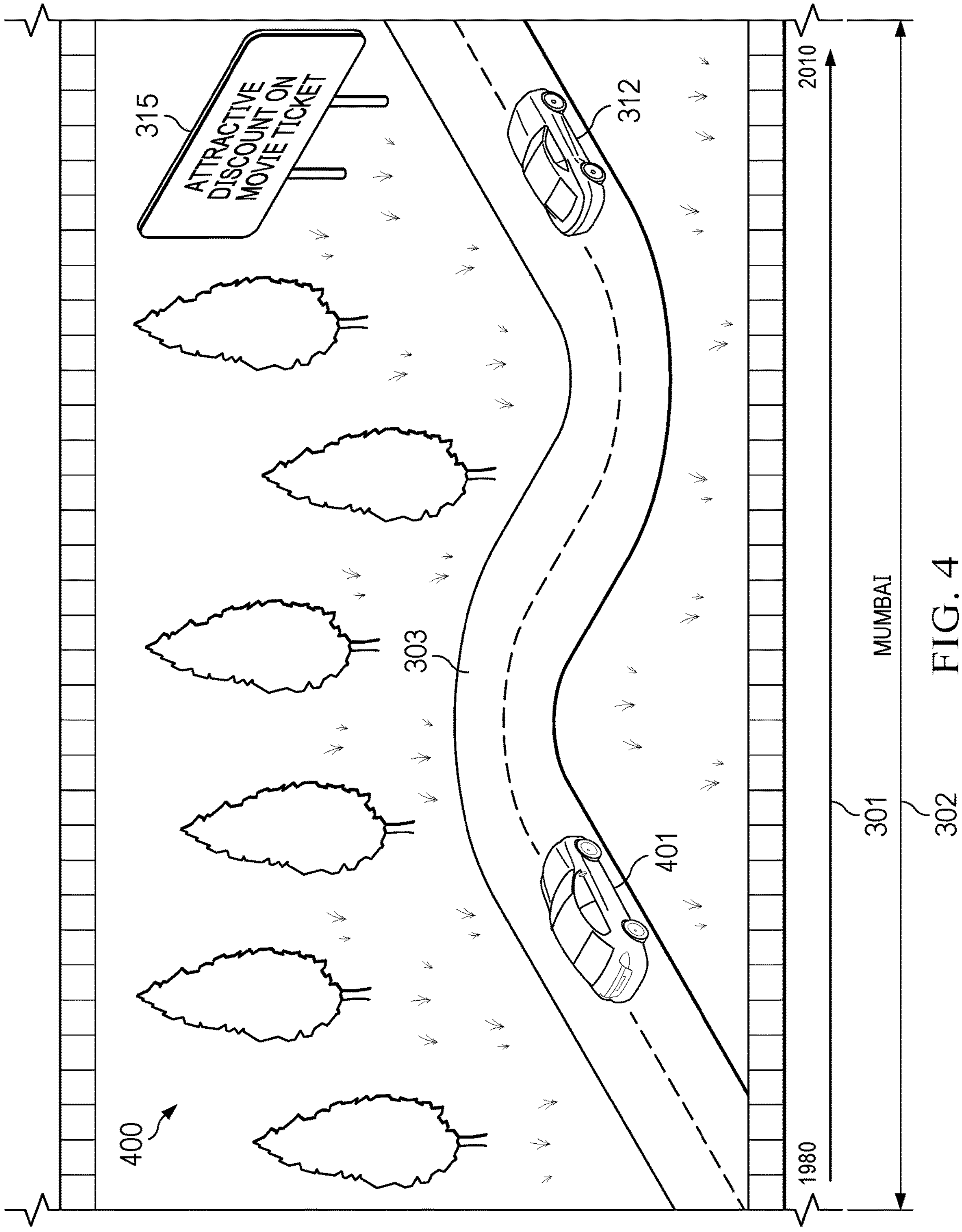
FIG. 4 is an illustration of a revised frame in accordance with an illustrative embodiment.

With reference now to FIG. 4, an illustration of a revised frame is depicted in accordance with an illustrative embodiment. In the illustrative examples, the same reference numeral may be used in more than one figure. This reuse of a reference numeral in different figures represents the same element in the different figures. In this illustrative example, revised frame 400 is an example of an implementation for revised frame 226 in FIG. 2.

In this example, billboard 314 has been modified by being removed and is not present in revised frame 400. Billboard 315 remains unchanged. Vehicle 310 has been modified by being removed and is not present in revised frame 400. Vehicle 311 has been modified by augmenting this vehicle in which vehicle 311 has been replaced with vehicle 401. Vehicle 401 is an older model vehicle that fits within model time context 301. Vehicle 312 has not been modified in this example.

In this example, object augmentation can be performed using a generative adversarial network (GAN). In this example, a generator and a discriminator are used where the generator creates realistic images of an object from a given time and geography. The GAN can also be used to remove objects from frame 400.

Figure 5:
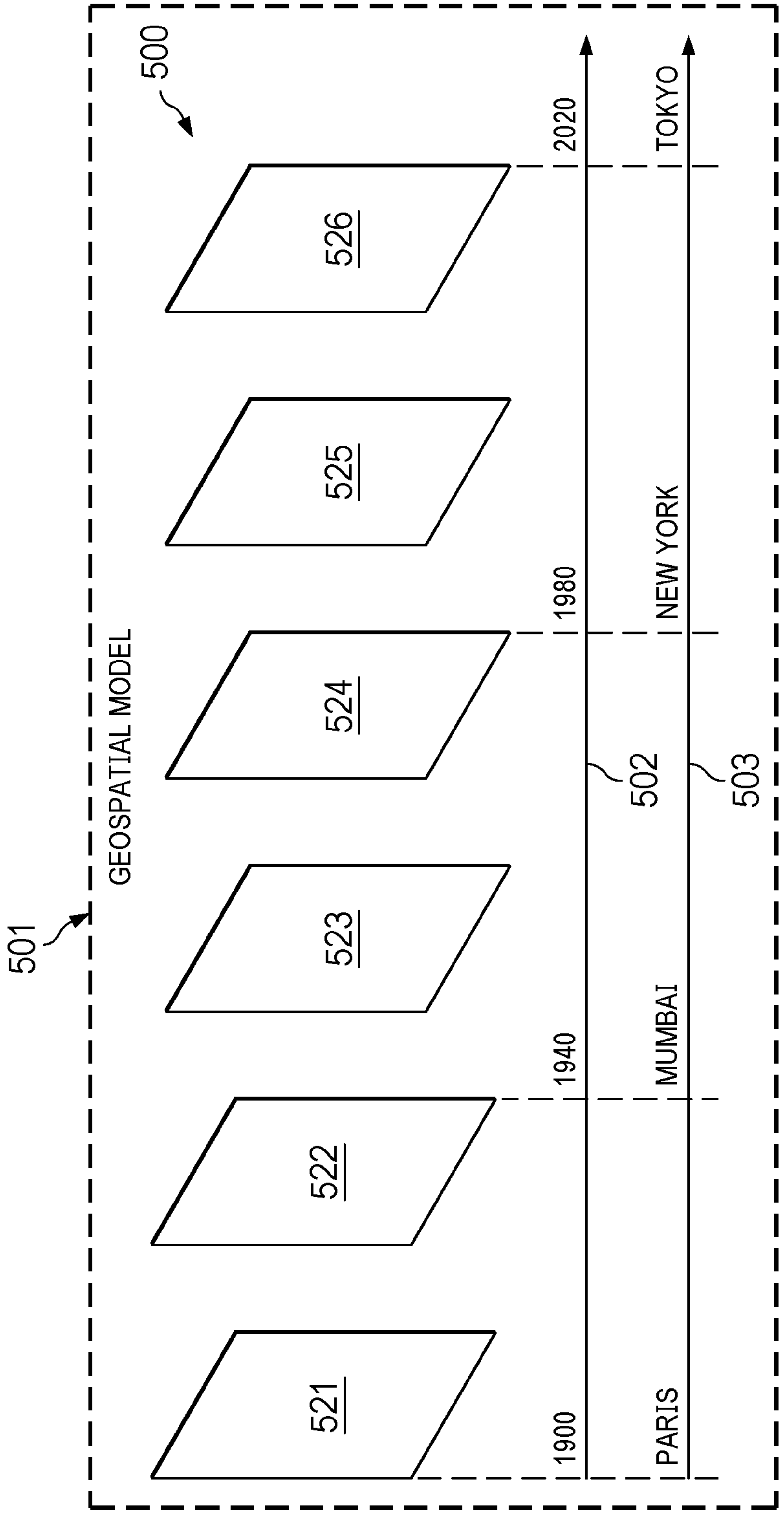
FIG. 5 is an illustration and association of frames to a geospatial model in accordance with an illustrative embodiment.

Turning next to FIG. 5, an illustration and association of frames to a geospatial model is depicted in accordance with an illustrative embodiment. In this example, frames 500 are associated with model time contexts and model object locations in geospatial model 501. As depicted, geospatial model 501 includes model time context 502 and model geographic location 503. In this example, model time context 502 is the timeline from 1900 to 2020. Model geographic location 503 includes Paris, Mumbai, New York, and Tokyo. As a result, different frames in frames 500 can have different times in model time context 502 and different locations in model geographic location 503. For example, frame 521 has 1915 for model time context 502 and Paris for model geographic location 503; frame 522 has 1940 for model time context 502 and Mumbai for model geographic location 503; frame 523 has 1960 for model time context 502 and Mumbai for model geographic location 503; frame 524 has 1980 for model time context 502 and New York for model geographic location 503; frame 525 has 2000 for model time context 502 and New York for model geographic location 503; and frame 526 has 2020 for model time context 502 and Tokyo for model geographic location 503.

In this example, frames 500 can be tagged or associated with this geospatial information in geospatial model 501. The tagging can be performed by associating or including frame identifiers with the different years for model time context 502 and locations for model geographic location 503 in geospatial model 501.

Figure 6:
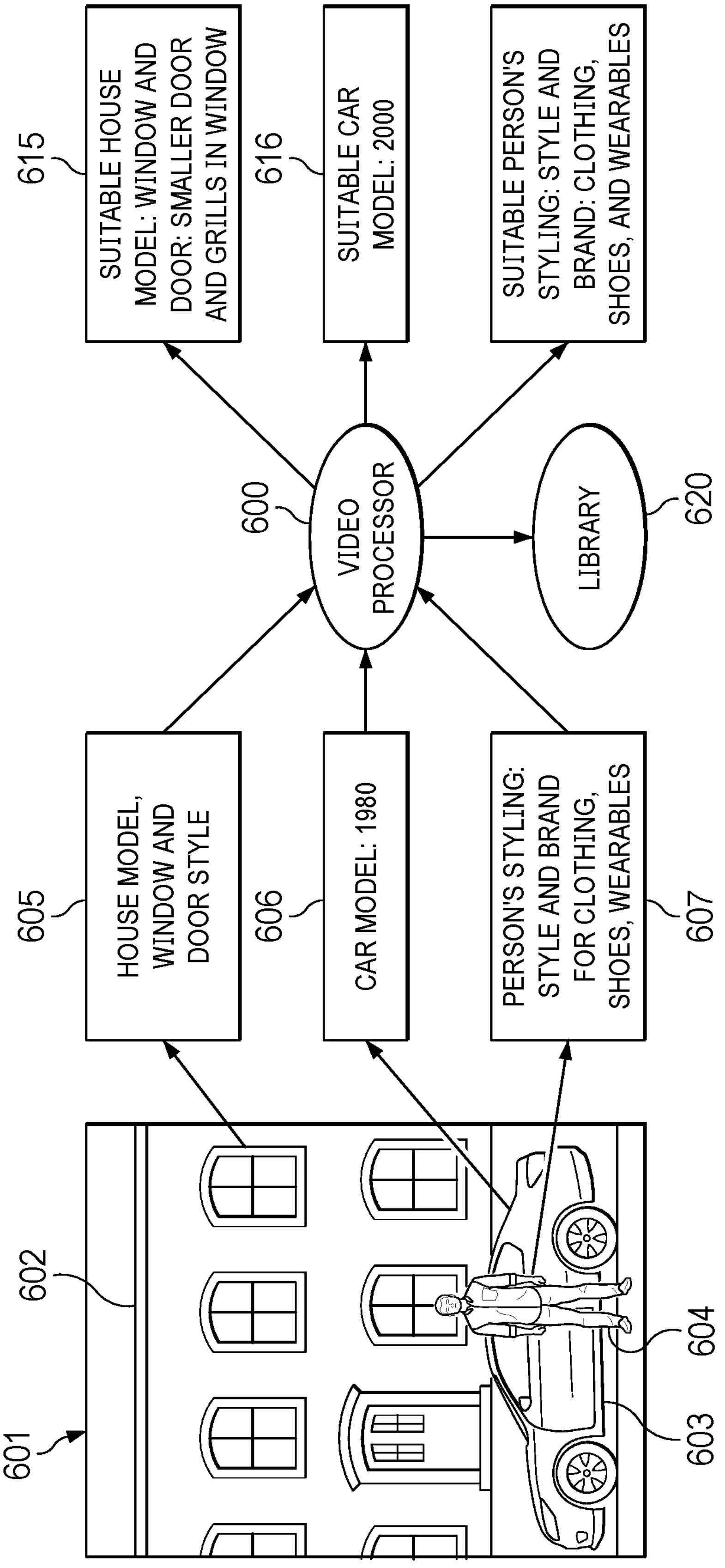
FIG. 6 is a dataflow diagram for processing a frame in a video in accordance with an illustrative embodiment.

Turning next to FIG. 6, a dataflow diagram for processing a frame in a video is depicted in accordance with an illustrative embodiment. In this illustrative example, video processor 600 is an example of video processor 214 in FIG. 2 and processes frame 601 to determine whether objects in this frame fit the geospatial model for frame 601. The geospatial model defines video attributes in the form of a model time context and a model geographic location for frame 601. In this example, model time context is the year 2000 and model geographic location is New York. In this example, the objects are house 602, car 603, and person 604.

Video processor 600 determines object attributes 605 for house 602. In this example, object attributes 605 can include an object time context and an object geographic location. In this example, object attributes 605 for the house model can be based on features of house 602 such as the window and door style for house 602.

The window and door style identified for house 602 can be compared to the window and door that are present for a model time context and a model geographic location in the geospatial model for frame 601. Video processor 600 uses library 620 to determine whether object attributes 605 fit the geospatial model. Library 620 is a collection of images of objects.

In this example, video processor 600 can search library 620 to determine whether the window and door style in object attributes 605 for house 602 meets the window and door style for the geospatial model by searching library 620.

In this illustrative example, library 620 is a collection of images and designs for various objects that can be searched. In this example, video processor 600 can use an artificial intelligence system to perform the searching and analysis.

If video processor 600 determines that house 602 does not fit the model time context and the model geographic location for frame 601 in the geospatial model, video processor 600 can modify house 602. This modification can include identifying augmented object attributes 615. This augmentation can include changing the door to a smaller door and adding grills in the window.

As another example, video processor 600 identifies attributes 606 for car 603. In this example, car 603 is a 1980 model car and does not fit the geospatial model. Video processor 600 can also modify car 603 by augmenting car 603 with a suitable car model for the model time context of the year 2000 for frame 601. In this case, augmented object attributes 616 is a model year 2000 car. In this example, car 603 can be replaced with the newer model year. The image of the replacement card can be found in library 620.

Further in this example, video processor 600 identifies object attributes 607 for person 604. In this example, object attributes 607 can be based on the person's style and brand for clothing, shoes, and wearables. In this example, a syncytial for authors note that the geospatial model. Video processor 600 can identify suitable styling for person 604 by searching library 620. In this example, clothing, shoes, and wearables can be changed for person 604 to meet the model time context of year 2000 and model geographic location of New York.

Figure 7:
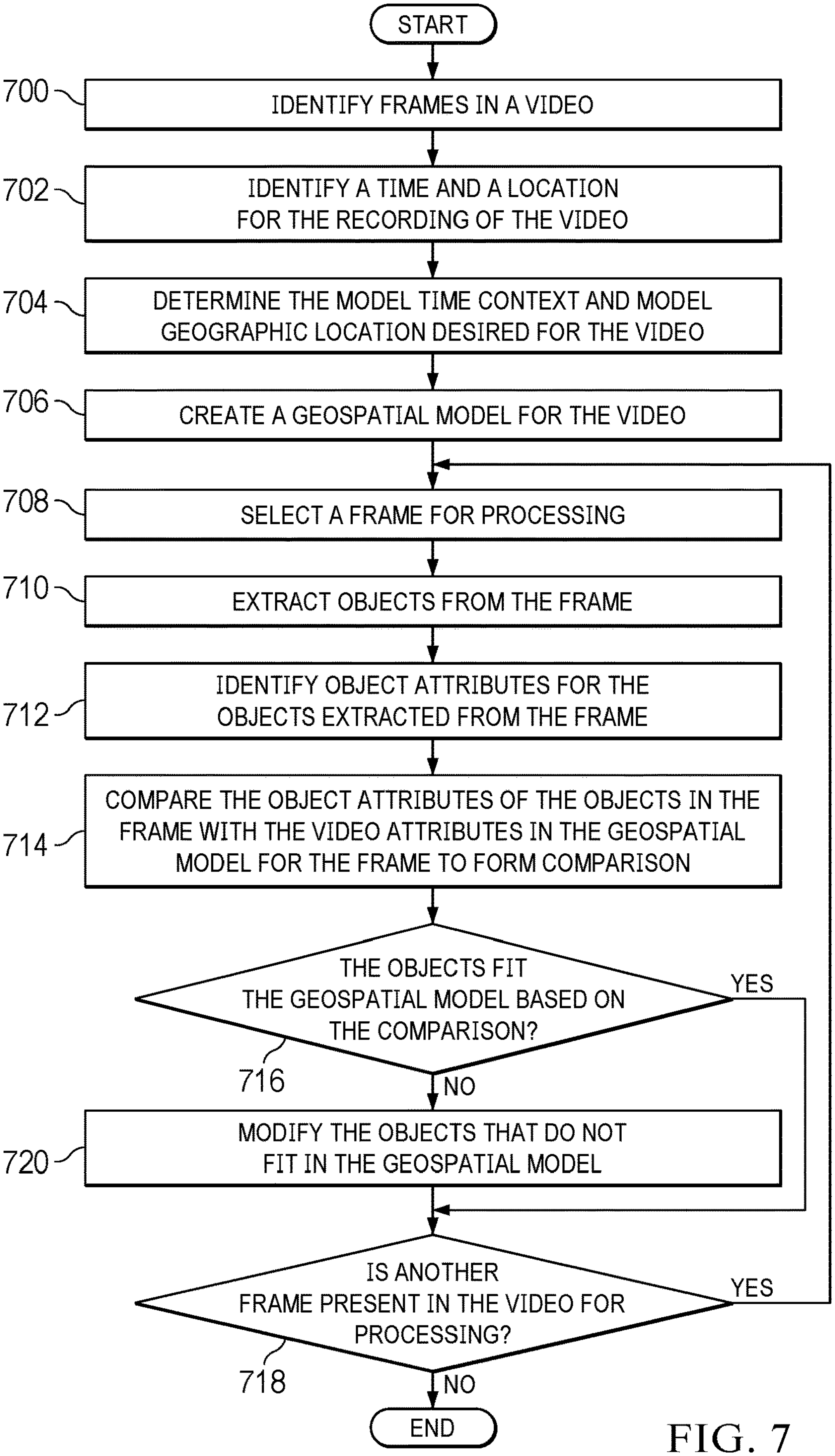
FIG. 7 is a flowchart of a process for processing a video in accordance with an illustrative embodiment.

Turning next to FIG. 7, a flowchart of a process for processing a video is depicted in accordance with an illustrative embodiment. The process in FIG. 7 can be implemented in hardware, software, or both. When implemented in software, the process can take the form of program instructions that are run by a processor set located in one or more hardware devices in one or more computer systems. For example, the process can be implemented in video processor 214 in computer system 212 in FIG. 2.

The process begins by identifying frames in a video (step 700). The process then identifies a time and a location for the recording of the video (step 702). The process determines the model time context and model geographic location desired for the video (step 704). In step 704, groups of frames can be identified as belonging to particular times and locations when more than one time and location is specified for the video. The process creates a geospatial model for the video (step 706). In step 706, the frames are associated with video attributes such as the model time context and model geographic location specified for the video.

The process selects a frame for processing (step 708). The process extracts objects from the frame (step 710). In step 710, object recognition techniques implemented in machine learning models can be used to recognize objects in the frames. The process identifies object attributes for the objects extracted from the frame (step 712). In step 712, the object attributes can also be identified using machine learning models. The object attributes for the object can include at least one of an object time context or an object geographic location. In other words, an object time context, object geographic location, or both can be identified for each object.

The process compares the object attributes of the objects in the frame with the video attributes in the geospatial model for the frame to form comparison (step 714). The process determines whether the objects fit the geospatial model based on the comparison (step 716). If the objects fit the geospatial model, the process determines another frame is present in the video for processing (step 718). If another frame is present, the process returns to step 708 to select another frame for processing.

With reference again to step 716, if one or more objects do not fit the geospatial model, the process modifies the objects that do not fit in the geospatial model (step 720). The process then proceeds to step 718 as described above. With reference again to step 718, if an additional frame is not present in processing, the process terminates.

Figure 8:
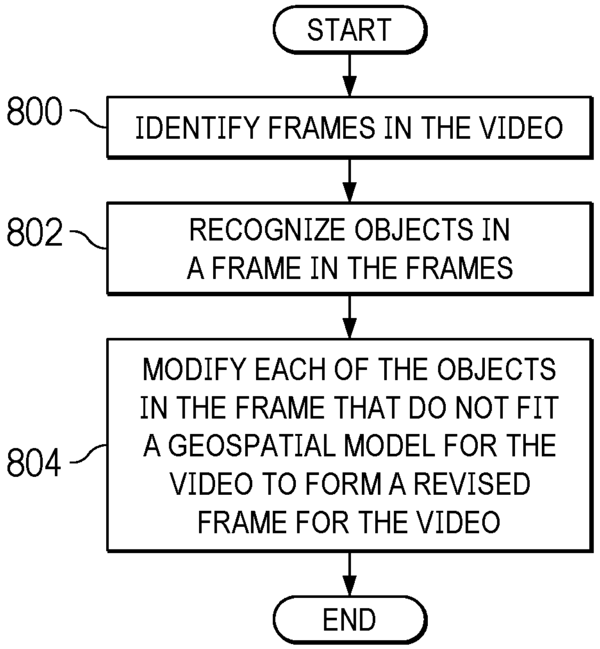
FIG. 8 is a flowchart of a process for processing a video in accordance with an illustrative embodiment.

Turning next to FIG. 8, a flowchart of a process for processing a video is depicted in accordance with an illustrative embodiment. The process in FIG. 8 can be implemented in hardware, software, or both. When implemented in software, the process can take the form of program instructions that are run by a processor set located in one or more hardware devices in one or more computer systems. For example, the process can be implemented in video processor 214 in computer system 212 in FIG. 2.

The process identifies frames in the video (step 800). The process recognizes objects in a frame in the frames (step 802).

The process modifies each of the objects in the frame that do not fit a geospatial model for the video to form a revised frame for the video (step 804). The process terminates thereafter.

Figure 9:
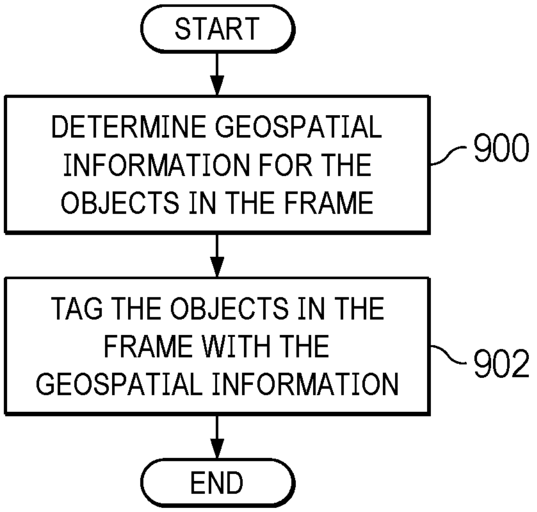
FIG. 9 is a flowchart of a process for tagging objects in accordance with an illustrative embodiment.

With reference now to FIG. 9, a flowchart of a process for tagging objects is depicted in accordance with an illustrative embodiment. This flowchart is an example of additional steps that can be performed with the steps in FIG. 8.

The process determines geospatial information for the objects in the frame (step 900). The process tags the objects in the frame with the geospatial information (step 902). The process terminates thereafter.

Figure 10:
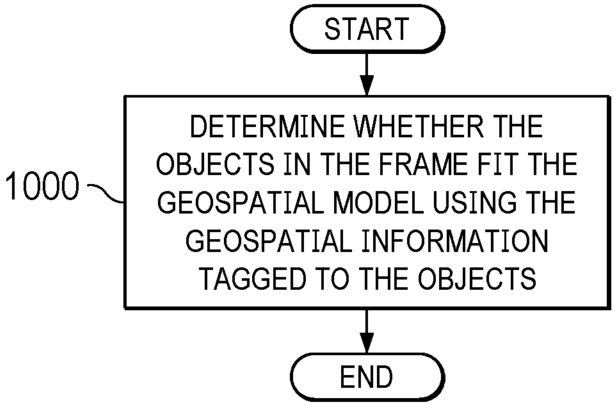
FIG. 10 is a flowchart of a process for determining whether objects fit a geospatial model in accordance with an illustrative embodiment.

Next in FIG. 10, a flowchart of a process for determining whether objects fit a geospatial model is depicted in accordance with an illustrative embodiment. This flowchart is an example of an additional step that can be performed with the steps in FIG. 8.

The process determines whether the objects in the frame fit the geospatial model using the geospatial information tagged to the objects (step 1000). The process terminates thereafter.

Figure 11:
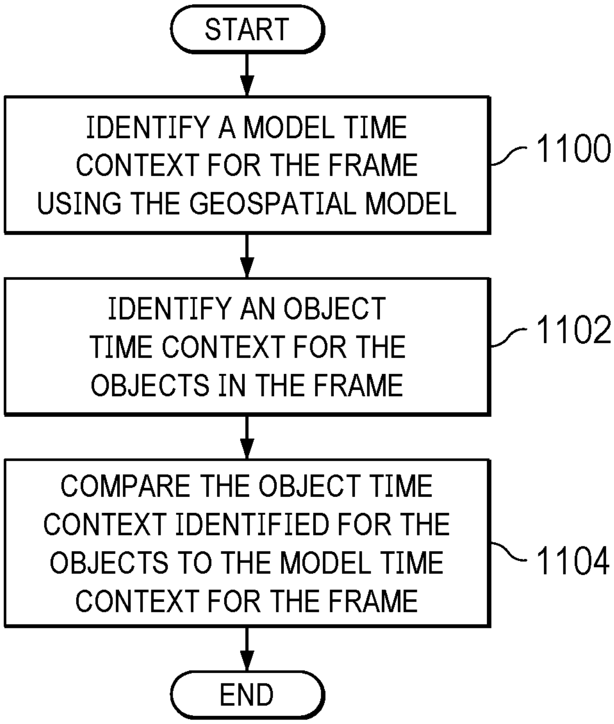
FIG. 11 is a flowchart of a process for determining whether objects fit a geospatial model in accordance with an illustrative embodiment.

Turning now to FIG. 11, a flowchart of a process for determining whether objects fit a geospatial model is depicted in accordance with an illustrative embodiment. This flowchart is an example of an implementation for step 1000 in FIG. 10.

The process identifies a model time context for the frame using the geospatial model (step 1100). The process identifies an object time context for the objects in the frame (step 1102).

The process compares the object time context identified for the objects to the model time context for the frame (step 1104). The process terminates thereafter.

Figure 12:
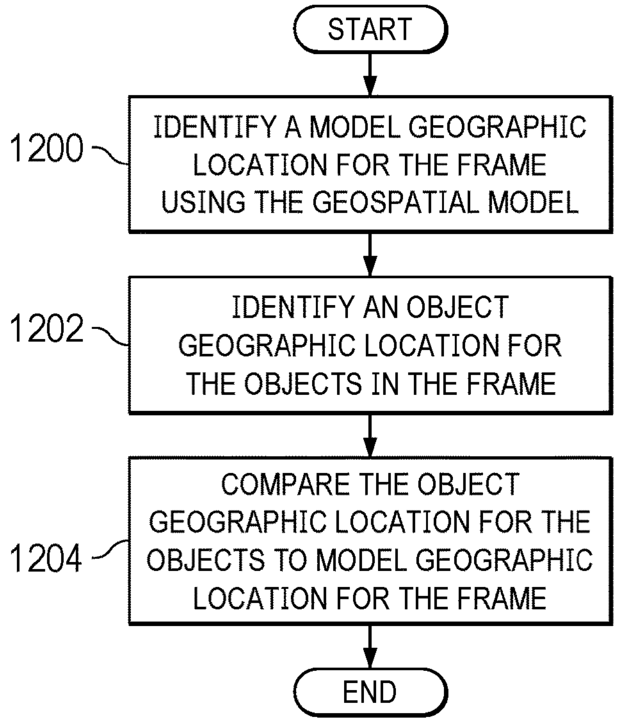
FIG. 12 is a flowchart of a process for determining whether objects fit a geospatial model in accordance with an illustrative embodiment.

With reference next to FIG. 12, a flowchart of a process for determining whether objects fit a geospatial model is depicted in accordance with an illustrative embodiment. This flowchart is another example of an implementation for step 1000 in FIG. 10.

The process begins by identifying a model geographic location for the frame using the geospatial model (step 1200). The process identifies an object geographic location for the objects in the frame (step 1202).

The process compares the object geographic location for the objects to model geographic location for the frame (step 1204). The process terminates thereafter.

Figure 13:
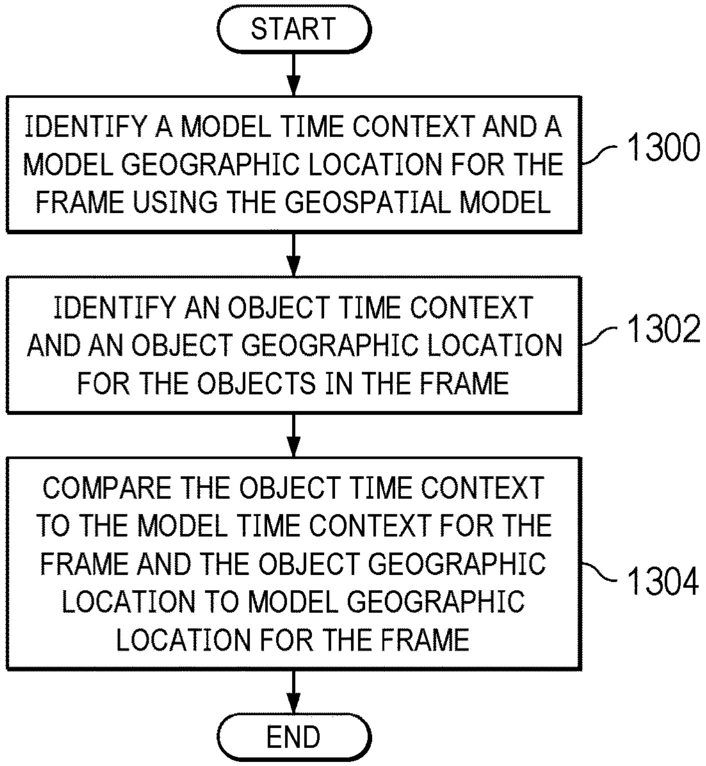
FIG. 13 is a flowchart of a process for determining whether objects fit a geospatial model in accordance with an illustrative embodiment.

Turning to FIG. 13, a flowchart of a process for determining whether objects fit a geospatial model is depicted in accordance with an illustrative embodiment. This flowchart is yet another example of an implementation for step 1000 in FIG. 10.

The process identifies a model time context and a model geographic location for the frame using the geospatial model (step 1300). The process identifies an object time context and an object geographic location for the objects in the frame (step 1302).

The process compares the object time context to the model time context for the frame and the object geographic location to model geographic location for the frame (step 1304). The process terminates thereafter.

Figure 14:
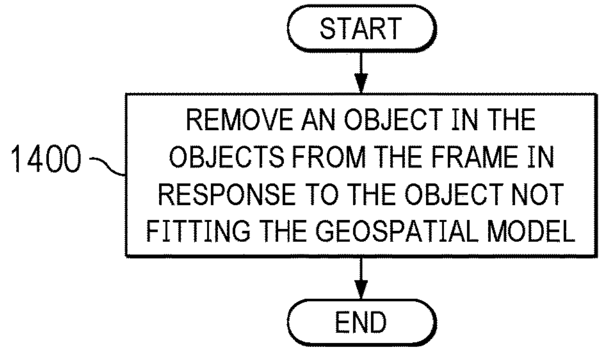
FIG. 14 is a flowchart of a process for modifying objects in accordance with an illustrative embodiment.

Next in FIG. 14, a flowchart of a process for modifying objects is depicted in accordance with an illustrative embodiment. The process in this figure is an example of an implementation for step 804 in FIG. 8.

The process removes an object in the objects from the frame in response to the object not fitting the geospatial model (step 1400). The process terminates thereafter.

Figure 15:
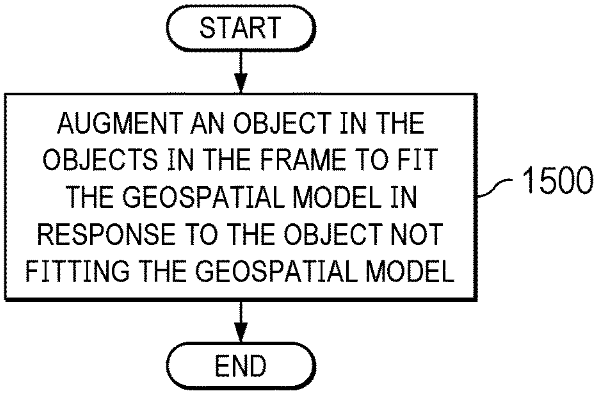
FIG. 15 is a flowchart of a process for modifying objects in accordance with an illustrative embodiment.

With reference now to FIG. 15, a flowchart of a process for modifying objects is depicted in accordance with an illustrative embodiment. The process in this figure is an example of an implementation for step 804 in FIG. 8.

The process augments an object in the objects in the frame to fit the geospatial model in response to the object not fitting the geospatial model (step 1500). The process terminates thereafter.

Figure 16:
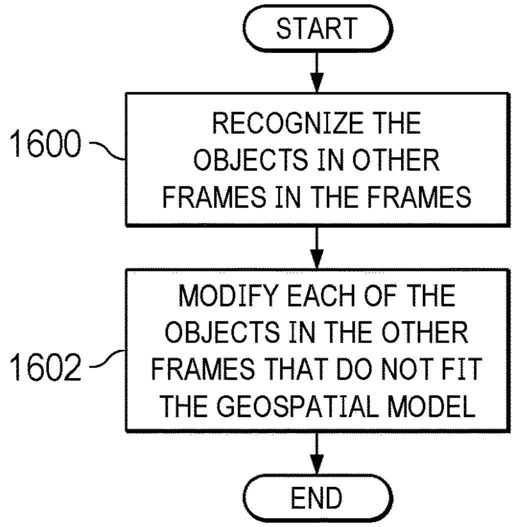
FIG. 16 is a flowchart of a process for processing frames in the video in accordance with an illustrative embodiment.

With reference to FIG. 16, a flowchart of a process for processing frames in the video is depicted in accordance with an illustrative embodiment. The process in this figure is an example of additional steps that can be performed with the steps in FIG. 8.

The process recognizes the objects in other frames in the frames (step 1600). The process modifies each of the objects in the other frames that do not fit the geospatial model (step 1602). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 17:
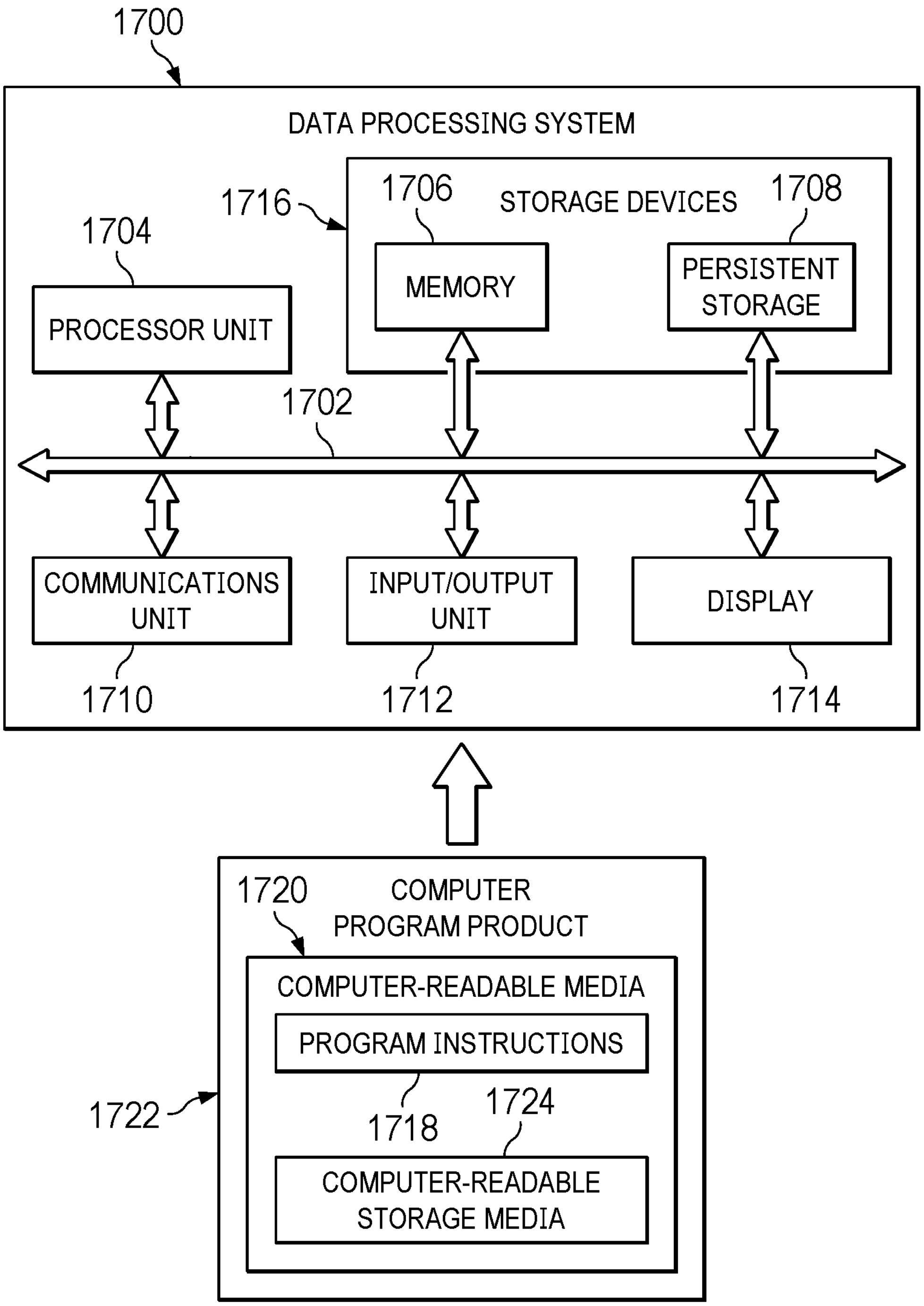
FIG. 17 is a block diagram of a data processing system in accordance with an illustrative embodiment.

Turning now to FIG. 17, a block diagram of a data processing system is depicted in accordance with an illustrative embodiment. Data processing system 1700 can be used to implement computers and computing devices in computing environment 100 in FIG. 1. Data processing system 1700 can also be used to implement computer system 212 in FIG. 2. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 takes the form of a bus system.

Processor unit 1704 serves to execute instructions for software that can be loaded into memory 1706. Processor unit 1704 includes one or more processors. For example, processor unit 1704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1704 can be implemented using one or more heterogeneous processor systems in which a main processor is present with secondary processors on a single chip. As another illustrative example, processor unit 1704 can be a symmetric multi-processor system containing multiple processors of the same type on a single chip.

Memory 1706 and persistent storage 1708 are examples of storage devices 1716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1716 may also be referred to as computer-readable storage devices in these illustrative examples. Memory 1706, in these examples, can be, for example, a random-access memory or any other suitable volatile or non-volatile storage device. Persistent storage 1708 may take various forms, depending on the particular implementation.

For example, persistent storage 1708 may contain one or more components or devices. For example, persistent storage 1708 can be a hard drive, a solid-state drive (SSD), a flash memory, a rewritable optical disk, a rewritable magnetic tape, or some combination of the above. The media used by persistent storage 1708 also can be removable. For example, a removable hard drive can be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that can be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs can be located in storage devices 1716, which are in communication with processor unit 1704 through communications framework 1702. The processes of the different embodiments can be performed by processor unit 1704 using computer-implemented instructions, which may be located in a memory, such as memory 1706.

These instructions are referred to as program instructions, computer usable program instructions, or computer-readable program instructions that can be read and executed by a processor in processor unit 1704. The program instructions in the different embodiments can be embodied on different physical or computer-readable storage media, such as memory 1706 or persistent storage 1708.

Program instructions 1718 are located in a functional form on computer-readable media 1720 that is selectively removable and can be loaded onto or transferred to data processing system 1700 for execution by processor unit 1704. Program instructions 1718 and computer-readable media 1720 form computer program product 1722 in these illustrative examples. In the illustrative example, computer-readable media 1720 is computer-readable storage media 1724.

Computer-readable storage media 1724 is a physical or tangible storage device used to store program instructions 1718 rather than a medium that propagates or transmits program instructions 1718. Computer-readable storage media 1724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1718 can be transferred to data processing system 1700 using a computer-readable signal media. The computer-readable signal media are signals and can be, for example, a propagated data signal containing program instructions 1718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1720" can be singular or plural. For example, program instructions 1718 can be located in computer-readable media 1720 in the form of a single storage device or system. In another example, program instructions 1718 can be located in computer-readable media 1720 that is distributed in multiple data processing systems. In other words, some instructions in program instructions 1718 can be located in one data processing system while other instructions in program instructions 1718 can be located in one data processing system. For example, a portion of program instructions 1718 can be located in computer-readable media 1720 in a server computer while another portion of program instructions 1718 can be located in computer-readable media 1720 located in a set of client computers.

The different components illustrated for data processing system 1700 are not meant to provide architectural limitations to the manner in which different embodiments can be implemented. In some illustrative examples, one or more of the components may be incorporated in or otherwise form a portion of, another component. For example, memory 1706, or portions thereof, may be incorporated in processor unit 1704 in some illustrative examples. In other examples, more than one processor unit can be present. The different illustrative embodiments can be implemented in a data processing system including components in addition to or in place of those illustrated for data processing system 1700. Other components shown in FIG. 17 can be varied from the illustrative examples shown. The different embodiments can be implemented using any hardware device or system capable of running program instructions 1718.

Thus, illustrative embodiments of the present invention provide a computer implemented method, computer system, and computer program product for processing a video. In one illustrative example, a computer implemented method processes a video. In processing the video, a processor set identifies frames in the video. The processor set recognizes objects in a frame in the frames. The processor set modifies each of the objects in the frame that do not fit the geospatial model for the frames to form a revised frame for the video.

In one or more illustrative examples, the processing of frames in a video using a geospatial model can increase the accuracy in which objects are consistent with the time and location for the video. In the illustrative examples, a video can be processed on a frame-by-frame basis to identify objects. Object attributes for those objects can be identified and compared to the desired attributes for the video. In the different illustrative examples, the object time context and the object geographic location identified for an object in a frame can be compared to the model time context and the model geographic location for the frame. This comparison can be made to determine whether the object should be modified. Modifications can be made to increase the accuracy or authenticity of the video with respect to the time and location specified in the video. In this manner, fewer errors in movies or commercials can occur.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for processing a video, the computer implemented method comprising:

identifying, by a processor set, frames in the video;

identifying, by the processor set, a historical time context for the frames, wherein the historical time context comprises a desired past historical time period that content in the video is intended to represent for historical authenticity, the desired past historical time period being different from an actual time when the video was recorded;

creating, by the processor set, a geospatial model for the video based on the historical time context and a geographic location that the video is intended to represent, the geospatial model defining period-appropriate attributes for objects consistent with the historical time context and the geographic location, and the geospatial model associating the frames with the historical time context and the geographic location;

recognizing, by the processor set, objects in a frame in the frames, wherein the recognizing of the objects in the frame is performed subsequent to the creating of the geospatial model such that the geospatial model is fully established before any object in the frame is recognized; and modifying, by the processor set, each of the objects in the frame that do not fit the geospatial model pertaining to the historical time context for the frame for the video to form a revised frame for the video.

2. The computer implemented method of claim 1 further comprising:

determining, by the processor set, geospatial information for the objects in the frame;

tagging, by the processor set, the objects in the frame with the geospatial information, and wherein modifying each of the objects further comprises:

identifying, by the processor set, an object time context for each object indicating when the object was available or present;

comparing, by the processor set, the object time context to the historical time context for the frame; and replacing, by the processor set, objects having an object time context that does not match the historical time context with period-appropriate alternatives.

3. The computer implemented method of claim 2 further comprising:

determining, by the processor set, whether the objects in the frame fit the geospatial model using the geospatial information tagged to the objects.

4. The computer implemented method of claim 3, wherein determining, by the processor set, whether the objects in the frame fit the geospatial model comprises:

identifying, by the processor set, a model time context for the frame using the geospatial model;

identifying, by the processor set, an object time context for the objects in the frame; and comparing, by the processor set, the object time context identified for the objects to the model time context for the frame.

5. The computer implemented method of claim 3, wherein determining, by the processor set, whether the objects in the frame fit the geospatial model comprises:

identifying, by the processor set, a model geographic location for the frame using the geospatial model;

identifying, by the processor set, an object geographic location for the objects in the frame; and comparing, by the processor set, the object geographic location for the objects to model geographic location for the frame.

6. The computer implemented method of claim 3, wherein determining, by the processor set, whether the objects in the frame fit the geospatial model comprises:

identifying, by the processor set, a model time context and a model geographic location for the frame using the geospatial model;

identifying, by the processor set, an object time context and an object geographic location for the objects in the frame; and comparing, by the processor set, the object time context to the model time context for the frame and the object geographic location to model geographic location for the frame.

7. The computer implemented method of claim 1, wherein modifying, by the processor set, each of the objects comprises:

removing, by the processor set, an object in the objects from the frame in response to the object not fitting the geospatial model.

8. The computer implemented method of claim 1, wherein modifying, by the processor set, each of the objects comprises:

augmenting, by the processor set, an object in the objects in the frame to fit the geospatial model in response to the object not fitting the geospatial model.

9. The computer implemented method of claim 1 further comprising:

recognizing, by the processor set, the objects in other frames in the frames; and modifying, by the processor set, each of the objects in the other frames that do not fit the geospatial model.

10. A computer system comprising:

a processor set;

a set of one or more computer-readable storage media; and program instructions, collectively stored in the set of one or more storage media, for causing the processor set to perform the following computer operations:

identify frames in a video;

identify a historical time context for the frames, wherein the historical time context comprises a desired past historical time period that content in the video is intended to represent for historical authenticity, the desired past historical time period being different from an actual time when the video was recorded;

create a geospatial model for the video based on the historical time context and a geographic location that the video is intended to represent, the geospatial model defining period-appropriate attributes for objects consistent with the historical time context and the geographic location, and the geospatial model associating the frames with the historical time context and the geographic location;

recognize objects in a frame in the frames, wherein the recognizing of the objects in the frame is performed subsequent to the creating of the geospatial model such that the geospatial model is fully established before any object in the frame is recognized; and modify each of the objects in the frame that do not fit the geospatial model pertaining to the historical time context for the frame for the video to form a revised frame for the video.

11. The computer system of claim 10, wherein the program instructions, collectively stored in the set of one or more storage media, further causes the processor set to perform the following computer operations:

determine geospatial information for the objects in the frame;

tag the objects in the frame with the geospatial information, and wherein modifying each of the objects further comprises:

identifying, by the processor set, an object time context for each object indicating when the object was available or present;

comparing, by the processor set, the object time context to the historical time context for the frame; and replacing, by the processor set, objects having an object time context that does not match the historical time context with period-appropriate alternatives.

12. The computer system of claim 11, wherein the program instructions, collectively stored in the set of one or more storage media, further causes the processor set to perform the following computer operation:

determine whether the objects in the frame fit the geospatial model using the geospatial information tagged to the objects, wherein the geospatial model defines a model time context and a model geographic location for the frames.

13. The computer system of claim 12, wherein as part of determining whether the objects in the frame fit the geospatial model, the program instructions, collectively stored in the set of one or more storage media, further causes the processor set to perform the following computer operations:

identify the model time context for the frame using the geospatial model;

identify an object time context for the objects in the frame; and compare the object time context to the model time context for the frame.

14. The computer system of claim 12, wherein as part of determining whether the objects in the frame fit the geospatial model, the program instructions, collectively stored in the set of one or more storage media, further causes the processor set to perform the following computer operations:

identify the model geographic location for the frame using the geospatial model;

identify an object geographic location for the objects in the frame; and compare the object geographic location to model geographic location for the frame.

15. The computer system of claim 12, wherein as part of determining whether the objects in the frame fit the geospatial model, the program instructions, collectively stored in the set of one or more storage media, further causes the processor set to perform the following computer operations:

identify the model time context and the model geographic location for the frame using the geospatial model;

identify an object time context and an object geographic location for the objects in the frame; and compare the object time context to the model time context for the frame and the object geographic location to model geographic location for the frame.

16. The computer system of claim 12, wherein as part of determining whether the objects in the frame fit the geospatial model, the program instructions, collectively stored in the set of one or more storage media, further causes the processor set to perform the following computer operation:

remove an object in the objects from the frame in response to the object not fitting the geospatial model.

17. The computer system of claim 10, wherein as part of modifying each of the objects, the program instructions, collectively stored in the set of one or more storage media, further causes the processor set to perform the following computer operation:

augment an object in the objects in the frame to fit the geospatial model in response to the object not fitting the geospatial model.

18. The computer system of claim 10, wherein the program instructions, collectively stored in the set of one or more storage media, further causes the processor set to perform the following computer operations:

recognize the objects in other frames in the frames; and modify each of the objects in the other frames that do not fit the geospatial model.

19. A computer program product for processing a video, the computer program product comprising:

a set of one or more computer-readable storage media;

program instructions, collectively stored in the set of one or more storage media, for causing a processor set to perform the following computer operations:

identify frames in the video;

identify a historical time context for the frames, wherein the historical time context comprises a desired past historical time period that content in the video is intended to represent for historical authenticity, the desired past historical time period being different from an actual time when the video was recorded;

create a geospatial model for the video based on the historical time context and a geographic location that the video is intended to represent, the geospatial model defining period-appropriate attributes for objects consistent with the historical time context and the geographic location, and the geospatial model associating the frames with the historical time context and the geographic location;

recognize objects in a frame in the frames, wherein the recognizing of the objects in the frame is performed subsequent to the creating of the geospatial model such that the geospatial model is fully established before any object in the frame is recognized; and modify each of the objects in the frame that do not fit the geospatial model pertaining to the historical time context for the frame for the video to form a revised frame for the video.

20. The computer program product of claim 19, wherein program instructions, collectively stored in the set of one or more storage media further cause the processor set to:

determine geospatial information for the objects in the frame;

tag the objects in the frame with the geospatial information, and wherein modifying each of the objects further comprises:

identify an object time context for each object indicating when the object was available or present;

compare the object time context to the historical time context for the frame; and replace objects having an object time context that does not match the historical time context with period-appropriate alternatives.

* * * * *